United States Patent [19]
Yokota

[11] Patent Number: 5,256,345
[45] Date of Patent: Oct. 26, 1993

[54] INJECTION CONTROL METHOD FOR INJECTION MOLDER

[75] Inventor: Akira Yokota, Hirakata, Japan

[73] Assignee: Komatsu Ltd., Tokyo, Japan

[21] Appl. No.: 773,571

[22] PCT Filed: Mar. 4, 1991

[86] PCT No.: PCT/JP91/00285

§ 371 Date: Nov. 4, 1991

§ 102(e) Date: Nov. 4, 1991

[87] PCT Pub. No.: WO91/13743

PCT Pub. Date: Sep. 19, 1991

[30] Foreign Application Priority Data

Mar. 5, 1990 [JP] Japan .................. 2-53990

[51] Int. Cl.$^5$ .............................................. B29C 45/77
[52] U.S. Cl. ...................... 264/40.1; 264/40.5; 425/140; 425/145; 425/150
[58] Field of Search .................. 264/40.1, 40.5, 328.1, 264/40.6; 425/135, 145, 146, 147, 149, 150

[56] References Cited

U.S. PATENT DOCUMENTS

| | | | |
|---|---|---|---|
| 3,750,134 | 7/1973 | Weisend | 425/145 |
| 3,859,400 | 1/1975 | Ma | 425/145 |
| 3,932,083 | 1/1976 | Boettner | 425/145 |
| 4,816,197 | 3/1989 | Nunn | 264/40.1 |

FOREIGN PATENT DOCUMENTS 62-227617 10/1987 Japan .

OTHER PUBLICATIONS

Dominick V. Rosato et al., *Injection Molding Handbook*, 1986, pp. 98–102.

*Primary Examiner*—Jill L. Heitbrink
*Attorney, Agent, or Firm*—Armstrong, Teasdale, Schlafly & Davis

[57] ABSTRACT

An injection control method for controlling the weight of a plasticized synthetic resin injected from the cylinder of the injection molder to fill the cavity of a mold. An object of the invention is to offer the method for keeping the quality of the products constant even if there is an influence by outside disturbances or there is a change in the given conditions, such as the molten resin pressure. Another object is to offer a method wherein a study and an analysis from the beginning is not required, different from the adaptive control, in case of the change of the mold. The travel distance $S_D$ of the screw to the position for injecting the plasticized synthetic resin by the amount corresponding to the weight value G of a product is calculated by a specified calculation formula and preset. And the injection of the plasticized synthetic resin into the mold cavity is stopped when the screw has moved for the preset travel distances $S_D$ from the stop position immediately before injection.

8 Claims, 7 Drawing Sheets

IMMEDIATELY BEFORE INJECTION

DWELLING PROCESS FOLLOWING THE INJECTION

INJECTION CONTROL METHOD FOR INJECTION MOLDER

FIELD OF THE INVENTION

The present invention relates to an injection control method for controlling the weight of the plasticized synthetic resin injected from a cylinder of an injection molder to fill a cavity of the mold.

BACKGROUND OF THE INVENTION

In the conventional injection molding of plasticized synthetic resin by an injection molder, the weight of the injected plasticized synthetic resin varies with the molten resin pressure, the molten resin specific volume or the molten resin temperature (including the influence of the disturbance on the molding system) etc.. Therefore, it is difficult to form products of a constant quality. To cope with this problem, so-called adaptive control a number of proposals have been made. The art disclosed in the Japanese Patent Laid Open Publication No. 84932 of Showa 56 (the year 1981) is an example.

Basically, in the adaptive control method, when the influence of a disturbance on the molding system and change in the molten resin pressure, molten resin temperature or mold temperature are detected, a controllable molding condition (pressure, time, etc.) other than the detected factors, are changed into a control factor, thereby assuring the constant product quality.

However, this control method has the following problems:

1 Preliminary study and analysis are necessary to determine the correlation between the detected factor according to the mold and the product quality and between the control factor and the product quality.
2 With the same plasticized synthetic resin, the correlation between the detected factor and the product quality and between the control factor and the product quality varies greatly depending on the mold. Therefore, the study and analysis described in the item 1 above must be repeated each time the mold is changed.

In order to solve aforementioned problems, the present invention provides an injection control method of an injection molder, which assures the products of constant quality even when there is an influence to the molding system by the disorder from outside, there is a change in the given condition such as the change of the molten resin pressure and which does not require the analysis and the investigation from the beginning as in a case of the adaptive control method even the cavity is changed. the cavity is changed, and offers a molder products of of constant quality.

DISCLOSURE OF THE INVENTION

According to the present invention, in order to achieve the aforementioned object, an injection control method for controlling the weight of the plasticized synthetic resin injected from the cylinder of an injection molder to fill the cavity of a mold comprises the steps of: calculating the travel distance $S_D$ of the screw to the position for injecting plasticized synthetic resin by the amount corresponding to the weight value G of a product by using a specified calculation formula and preset it, on the basis of the weight value G of the product, and terminating the injection of the plasticized synthetic resin into the cavity when the screw has moved for the preset travel distance $S_D$ from the stop position immediately before injection.

Further, the calculation by using the specified formula for obtaining the travel distance $S_D$ of the screw to the position for injecting the plasticized synthetic resin by the amount corresponding to said weight value G of a product is carried out at a constant molten resin temperature value T, on the basis of the detected or set molten resin pressure value $P_I$ of plasticized synthetic resin immediately before injection, the detected or set molten resin pressure value $P_H$ of plasticized synthetic resin during the dwelling process following the injection, the detected positional value $S_I$ of the screw immediately before injection, and the PV property relation formula of plasticized synthetic resin, as follows:

$$S_D = S_I - S_H = V(P_H) \cdot \{G/A - S_I[1/V(P_I) - 1/V(P_H)]\}$$

wherein $S_H$: the positional value of the screw during the dwelling process following the injection.
A: projected sectional area of the screw
$V(P_H)$: the molten resin specific volume value during the dwelling process following the injection
$V(P_I)$: the molten resin specific volume value immediately before the injection.

Or, the calculation by using the specified formula for obtaining the travel distance $S_D$ of the screw to the position for injecting the plasticized synthetic resin by the amount corresponding to said weight value G of a product is carried out on the basis of the detected or set molten resin temperature value T of injected plasticized synthetic resin, molten resin pressure value $P_I$ of plasticized synthetic resin immediately before injection, molten resin pressure value $P_H$ of plasticized synthetic resin during the dwelling process following the injection, the detected positional value $S_I$ of the screw immediately before injection, and the PVT property relation formula of plasticized synthetic resin, as follows:

$$S_D = S_I - S_H = V(P_H, T) \cdot \{G/A - S_I[1/V(P_I, T) - 1/V(P_H, T)]\}$$

$S_H$: the positional value of the screw during the dwelling process following the injection
A: the projected sectional area of screw
$V(P_H, T)$: the molten resin specific volume value for the molten resin temperature value T and the molten resin pressure value $P_H$ during the dwelling process following the injection at the molten resin temperature value T, and
$V(P_I, T)$: the molten resin specific volume value for the molten resin temperature value T and the molten resin pressure $P_I$ immediately before the injection at the molten resin temperature value T.

Thus, according to the injection control method for an injection molder of the present invention, the travel distance of the screw for keeping the predetermined weight value G of the product constant is automatically controlled even there are influences by the disturbances from outside or there is a change in the given conditions such as the change of the molten resin pressure, as a result, the constant quality of the products is guaranteed. And different from the adaptive control, study and analysis from the beginning are required even when the mold is changed. And at the stage of fixing the molding conditions, molten resin pressure value etc. are often changed. In such cases, the travel distance of the screw is automatically controlled to the specified weight value G, so that the forming condition of a mold is easily fixed.

Furthermore, the fluctuation range of the molten resin pressure value $P_I$ and $P_H$ of the plasticized synthetic resin to be detected immediately before the injection and during the dwelling process following the injection, respectively, and the molten resin temperature value T of the plasticized synthetic resin to be injected is extremely small during the continual formation in a short period. And in order to improve the detecting accuracy by eliminating the error in a quite a short time, the mean value of the each molten resin pressure value $P_I$, $P_H$ and the molten resin temperature value T to be detected on the basis of the plurality of the injection fillings during the continual formation in a short period can be employed.

In calculating the molten resin specific volume value V from the molten resin pressure value P and molten resin temperature value T on the basis of the above-mentioned PVT property relation formula, the plane approximation method can be used on the assumption that the fluctuation of the molten resin pressure value P and molten resin temperature value T is within a specified range.

BRIEF DESCRIPTION OF THE DRAWINGS

FIGS. 1(A) and 1(B) are a semi-diagrammatical vertical sectional view and a partially enlarged vertical sectional view, respectively, of the injection molder relevant to the present invention;

FIGS. 2 and 3 are vertical sectional drawings showing the operation state of the screw in the Example 1 and 2 for the detecting method of the resin property, FIG. 4 is a graph explaining the extrapolation method for obtaining the molten resin volume value remaining in front of the screw;

FIG. 5 is a vertical sectional view showing the operation state of the screw for reference in obtaining the calculation formula for the travel distance of the screw for injecting resin of a constant weight value;

FIGS. 6 and 7 are semi-diagrammatical vertical sectional views of molding systems to which the first and second embodiments of a control method of the present invention are applied.

FIG. 8 is a graphical representation for describing the plain approximation method of PVT property relation formula.

PREFERRED EMBODIMENTS OF THE INVENTION

Some embodiments of the injection control method for an injection molder according to the present invention are described with reference to attached drawings.

Figure 1:
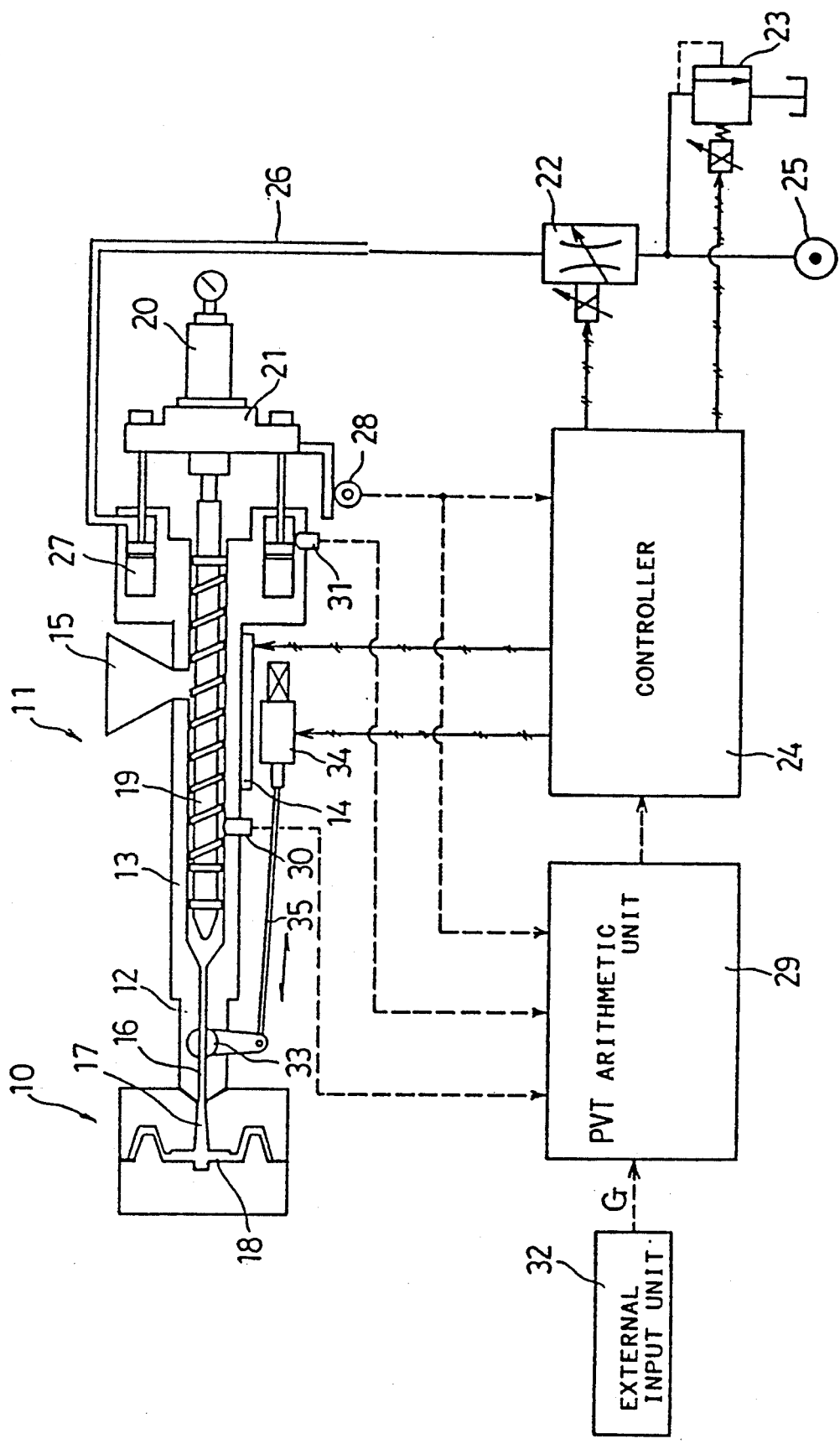
FIGS. 1 through 8 are drawings for explaining preferred embodiments of the injection control method for an injection molder according to the present invention.
Figure 1:
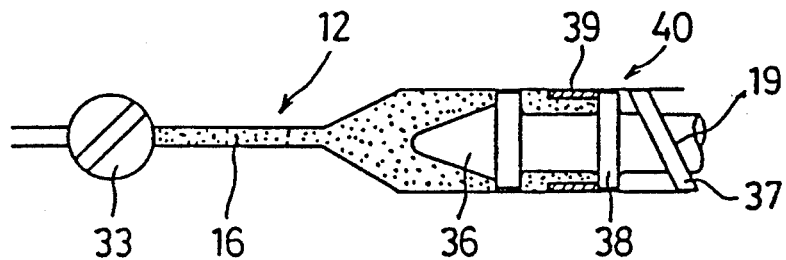

Referring to the FIG. 1(A), a schematical view of an entire injection molder, in forming a product by injection molding, an injection molder 11 is connected through a nozzle 12 with a mold 10 in which the product is formed. A screw 19 is contained in the cylinder 13 of the injection molder 11. Resin pellets supplied from a hopper 15 are melted and mixed in the cylinder 13 heated by a heater 14 into a plasticized synthetic resin, while the molten resin is measured and then injected by the screw 19 through a flow passage 16 formed in the nozzle 12 and through a gate 17 into the cavity 18 of the mold 10. To melt and mix the resin pellets, the screw 19 is rotated by a screw-driving motor 20. The screw 19 and the screw-driving motor 20 are fixed on a base 21 which is moved laterally in the drawing, by means of pressure oil supplied to a hydraulic piston device 27 through a pipe line 26 from a pressure oil supply 25. To supply the pressure oil, an electromagnetic flow valve 22 and an electromagnetic pressure valve 23 are controlled by a controller 24. In other words, the movement of the screw 19 toward and away from the nozzle 12 to measure the molten resin amount to be injected and to inject the measured molten resin into the cavity 18 of the mold 10, and the application of a specified pushing force to the screw 19 to provide a specified molten resin pressure to the molten resin in the cylinder 13 are all controlled through the base 21 by the pressure oil supplied to the hydraulic piston device 27. The base 21 is engaged with a screw position detector 28 for detecting the positional value of the screw 19, which is "0" at the left end, in the drawing, in the cylinder 13 and increases as the screw 19 moves toward the right. The screw position detector 28 comprises a potentiometer and an encoder etc.. The positional values of the screw 19 detected by the detector 28 minute by minute are sent to the controller 24 as well as to a PVT arithmetic unit 29 which determines the PVT property relation formula for plasticized synthetic resin when detecting the resin property. The PVT arithmetic unit 29 also operates the PV property relation formula to calculate the travel distance of the screw 19 and supplies the calculated result to the controller 24, thereby controlling the injection. The molten resin temperature value in the cylinder 13 detected by a resin temperature detector 30 is also transmitted to the PVT arithmetic unit 29. The oil pressure value for the hydraulic piston device 27, detected by an oil pressure detector 31, is also sent to the arithmetic unit 29 as the pushing force applied to the screw 19 or the molten resin pressure value P in the cylinder 13. 32 is an external input unit through which to input the measured weight value of injected molten resin to the PVT unit 29 when detecting the resin property. The molten resin pressure value P, molten resin temperature value T and other conditional values set for detecting the resin property are also input from the external input unit 32 through the PVT arithmetic unit 29 to the controller 24. The target weight value of molten resin to be injected is also input from this external input unit 32 to the PVT arithmetic unit 29.

The flow passage 16 of the nozzle 12 contains a block valve 33 as a flow path opening/closing mechanism of the present invention so as to interrupt the molten resin flow. The block valve 33 is operated through an operation lever 35 by an electromagnetic driving unit 34 which is controlled by the controller 24.

As shown in FIG. 1(B), a ring-shaped axially slidable valve plug 39 is provided between the conical end portion 36 and the flange projection 38 at the end of the spiral portion 37 of the screw 19. As the molten resin pressure in front of the screw 19 or in the left side of the screw end increases, the slidable valve plug 39 is pressed against the flange projection 38, thus preventing the molten resin from flowing back to the right. Thus, the flange projection 38 and the ring-shaped slidable valve plug 39 constitute a cheek valve 40. It must be noted that even if the screw position detector 28 reads "0" for the position of the screw 19, molten plasticized synthetic resin exists in the space between the front end of the screw 19 and the block valve 33, or more specifically between the check valve 40 and the block valve 33.

Now, the detecting method of resin property in fixing the PV(T) property relation formula which is employed in the injection control method of an injection molder is described in detail referring to Example 1.

EXAMPLE 1

Figure 2:
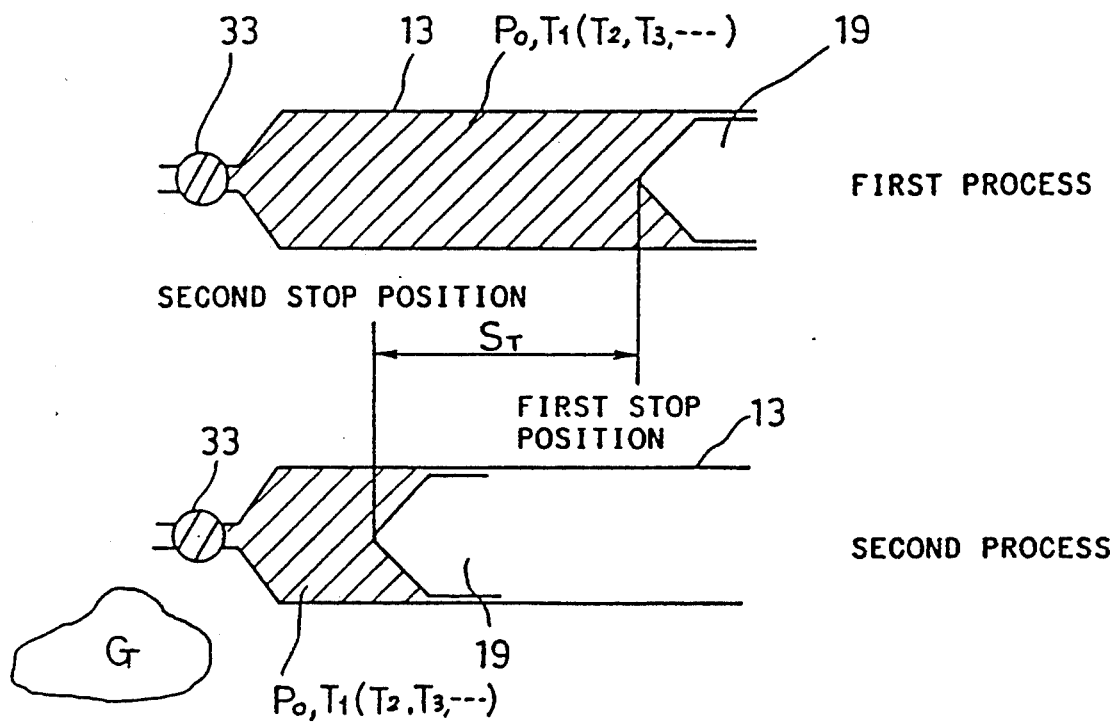

For the first phase of the method, the following three processes are repeated with various molten resin temperature values $T_1, T_2, T_3, \ldots$, under the constant molten resin pressure value $P_o$, to obtain the molten resin specific volume values $V_{01}, V_{02}, V_{03}, \ldots$ for the respective molten resin temperature values $T_1, T_2, T_3, \ldots$ (see FIG. 2).

1) First Process

The rotating screw 19 drives the molten plasticized synthetic resin toward the front of the screw 19. In the first process in which the block valve 33 is closed, the screw 19 is moved back because of the pressure of the molten resin existing in front of the screw 19. While the screw 19 is retreated to a preliminarily set initial position, the amount of the molten resin to be injected is measured. When the screw 19 has reached the initial position, the screw rotation is stopped. The arrival of the screw at the initial position is detected by the screw position detector 28 which sends the positional value of the screw 19 at the initial position to the controller 24. On the basis of this positional value, the controller 24 controls the pressure oil supply to the hydraulic piston device 27 so that a specified pushing force value $p_o$ is applied to the screw 19. Under the specified pushing force, the screw 19 makes a forward balancing movement, compressing the molten resin in front of the screw 19 with the aid of the function of the cheek valve 40. Thus, the molten resin pressure in the cylinder 13 increases. The screw 19 stops its forward movement at a first stop position when the applied pushing force balances the pressure of the compressed molten resin. The screw position detector 28 detects the positional value of the screw 19 at the first stop position and outputs the value to the PVT arithmetic unit 29. When the screw 19 is at the first stop position, the molten resin pressure value $P_o$ in front of the screw 19 is to correspond to the pushing force value $p_o$ applied to the screw 19.

2) Second Process

The block valve 33 ls opened, and the screw 19 is moved for a specified distance by the pushing force applied to the screw 19, so that molten resin is injected by the amount corresponding to the specified distance. The weight value G of amount of injected molten resin is measured by an external measuring instrument. The measureed weight value G is input from the external input unit 32 to the PVT arithmetic unit 29.

3) Third Process

The block valve 33 is closed again, and with this state, the oil pressure is controlled by the controller 24 in the same manner as in the first process so as to apply the specified pushing force value $p_o$ to the screw 19. Due to this pushing force, the screw 19 makes a forward or backward balancing movement, thus compressing the molten resin in front of the screw 19. The screw 19 stops at a second stop position when the applied pushing force balances the compressed molten resin pressure. The screw position detector 28 detects the positional value of the screw 19 at the second stop position and transmits the value to the PVT arithmetic unit 29.

The PVT arithmetic unit 29 calculates the difference $S_T$ between the positional value of the first stop position and that of the second stop position, or in other words, the molten resin volume value corresponding to the weight value G of the injected molten resin. The calculated molten resin volume value is divided by the weight value G to obtain a molten resin specific volume value $V_o$.

Figure 3:
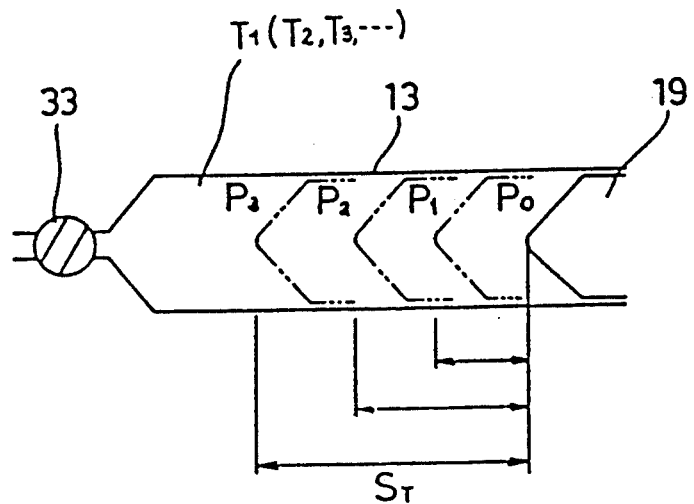

Thus, in the first phase, the series of the processes is repeated for various molten resin temperature values $T_1, T_2, T_3, \ldots$ under a constant specified pushing force value $p_o$ (molten resin pressure value $P_o$) to obtain the molten resin specific volume values $V_{01}, V_{02}, V_{03}, \ldots$ For the second phase, the following two processes are repeated for various molten resin temperature values $T_1, T_2, T_3$, under various molten resin pressure values $P_1, P_2, P_3$, to obtain the respective molten resin specific volume values $V_{11}, V_{21}, V_{31}, \ldots$ ; $V_{12}, V_{22}, V_{32}, V_{13}, V_{23}, V_{33}, \ldots$ (see FIG. 3).

1) First Process

Similar to the first process of the first phase, the screw 19 is rotated with the block valve 33 closed. The screw 19 is retreated and stopped at a preliminarily set initial position while the molten resin is measured. Then, a specified pushing force value $p_o$ is applied to the screw 19 to move the screw 19 forward so that the molten resin is compressed. The screw 19 stops its forward movement at a first stop position when the applied pushing force balances the pressure of the compressed molten resin. The positional value of the screw 19 at the first stop position is detected by the screw position detector 28 and sent to the PVT arithmetic unit 29. Other operations are the same as those in the first process of the first phase.

2) Second Process

A specified pushing force p is applied to the screw 19 with the block valve 33 closed. This time, the applied specified pushing force value p is increased gradually from $p_1$ to $p_2$ to $p_3$ and so on, with the pushing force value $p_o$ in the first process as a reference, thus gradually compressing the molten resin. When each of the pushing forces value $p_1, p_2, p_3, \ldots$ is applied, the screw 19 makes a balancing movement and stops at second, third, fourth or subsequent stop position. The positional value of each stop position is detected by the screw position detector 28 and sent to the PVT arithmetic unit 29.

The PVT arithmetic unit 29 calculates the difference $S_T$ of the positional value at the second, third, fourth or subsequent stop position from the positional value at the first stop position to obtain the molten resin volume value on the basis of the calculated difference. From each of the thus obtained molten resin volume values and the molten resin specific volume values $V_{01}$ ($V_{02}, V_{03} \ldots$ calculated in the first phase, molten resin specific volume values $V_{11}, V_{21}, V_{31}, \ldots$ ($V_{12}, V_{22}, V_{32}, \ldots$ ; $V_{13}, V_{23}, V_{33} \ldots$) are obtained by the proportional calculation. This proportional calculation is based on the fact that, for the compressed molten resin of the same molten resin temperature value T and of the same weight value G, the molten resin specific volume V is obtained from the ratios of molten resin volume values in case that the molten resin pressures value $P_o$(pushing force value $p_o$) is changed to $P_1, P_2, P_3 \ldots$ (pushing force value $p_1, p_2, p_3, \ldots$).

Thus, the series of calculation processes is repeated for each of the molten resin temperature values $T_1, T_2, T_3, \ldots$ under each of the pushing force values $p_1, p_2, p_3$, ... applied to the screw 19 (the molten resin pressure values $P_1$, $P_2$, $P_3$, ...), thereby obtaining the molten resin specific volume values $V_{11}$, $V_{21}$, $V_{31}$...; $V_{12}$, $V_{22}$, $V_{32}$, ... $V_{13}$, $V_{23}$. In this calculation process, the molten resin temperature value T is changed by controlling the heater 14 by the controller 24.

Even with the screw 19 at a position of the positional value "0", the molten resin remains between the front end of the screw 19 and the block valve 33. As various pushing forces are applied to the screw 19, the remaining molten pressure is compressed. This results in the positional values of the screw 19 at respective stop positions. Accordingly, if the PVT property relation formula established for a particular injection molder is applied to another injection molder whose remaining molten resin volume value is different from that in the particular injection molder, the calculation result will contain a large error that cannot be ignored.

In such a case, the remaining molten resin volume must be corrected to obtain an accurate molten resin specific volume value V. The correction method is described below:

i) When the remaining molten resin volume value is known as a design value for the equipment and given in term of the travel distance $S_o$ of the screw 19:

With the molten resin of the same molten resin temperature value T and of the same weight value G, pushing force values $p_x$ and $p_y$ are applied sequentially to the screw 19 after the molten resin has been measured. When the molten resin pressure values becomes $P_x$ or $P_y$, and the screw 19 stops its movement, the positional value $S_x$ or $S_y$ of the screw 19 at the stop position is detected. The travel distance $S_o$ is added to each of these positional values $S_x$ and $S_y$ to obtain each of corrective positional values $S_x$ ($=S_x+S_o$) and $S_y$ ($=S_y+S_o$). Then, the molten resin specific volume values $V_x$ and $V_y$ can be expressed by the following equations, respectively.

$$V_x = (\pi/4 D^2 S_x)/G \tag{1}$$

$$V_y = (\pi/4 D^2 S_y)/G \tag{2}$$

D: diameter of the screw

By taking the ratio of these equations, the following equation holds:

$$V_x/V_y = S_x/S_y (= (S_o+S_x)/(S_o+S_y)) \tag{3}$$

Figure 4:
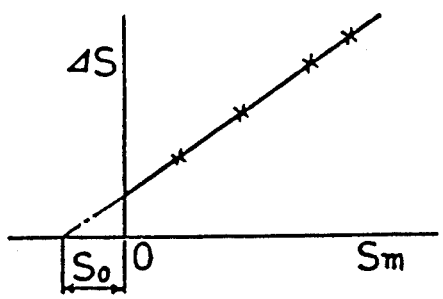

If the molten resin specific volume value $V_y$ is the molten resin specific volume values $V_{01}$, $V_{02}$, $V_{03}$ ... obtained in the first phase, the molten resin specific volume value $V_x$ can be calculated easily from the equation (3). Since the present embodiment of the invention obtains the molten resin specific volume value V similarly by calculating the ratios, the above method can be used directly in the present example.

ii) When the remaining molten resin volume value is unknown:

As shown on FIG. 4, the compression amount of the molten resin or the travel distance S of the screw 19 for the compression is proportional to the molten resin volume before compression or the positional value $S_m$ of the screw 19 before compression. The graph of a linear function is drawn by changing the positional value $S_m$ of the screw 19 in steps for a constant molten resin pressure value P and a constant molten resin temperature value T. The travel distance $S_o$ is obtained easily by the extrapolation on this graph. Other operations are the same as those described above.

For the third phase, each of the molten resin pressure values $P_o$, $P_1$, $P_2$, ..., each of the molten resin specific volume value $V_{01}$, $V_{02}$, $V_{03}$...; $V_{11}$, $V_{12}$, $V_{13}$...; $V_{21}$, $V_{22}$, $V_{23}$... and each of the molten resin temperature values $T_1$, $T_2$, $T_3$... obtained in the first and second phases are substituted in the general formula for the PVT property, to establish the PVT property relation formula.

Meanwhile, it is possible to obtain the following generalized function from the equation (3):

$$V/V_o = f(P/P_o) \tag{4}$$

wherein
P, V: given molten resin pressure value and molten resin specific volume value for the given molten resin pressure value
$P_o$, $V_o$ reference molten resin pressure value and molten resin specific volume value for the reference molten resin pressure value The above molten resin pressure values P and $P_o$ and molten resin specific volume values V and $V_o$ are given at the same molten resin temperature value T.

From the equation (4), the inventor has found that the PV property can be approximated by the following experimental formula:

$$f(P/P_o) = \exp\{a(\sqrt{P/P_o} - 1)\} \tag{5}$$

wherein
a: constant

Therefore, if the value for the constant "a" is obtained by changing the given molten resin pressure value P, the PV (T=constant) property relation formula can be obtained.

Further, the inventor has found that the value of the constant "a" is a function of the molten resin temperature value T and can be approximated as follows:

$$a(T) = b \cdot T + c \tag{6}$$

b, c: constants

The following general formula can be obtained from the equations (4), (5) and (6):

$$V = V_o \cdot \exp\{(b \cdot T + c) \cdot (\sqrt{P/P_o} - 1)\} \tag{7}$$

When each of the molten resin pressures values $P_o$, $P_1$, $P_2$, ..., each of the molten resin specific volume values $V_{01}$, $V_{02}$, $V_{03}$, ...; $V_{11}$, $V_{12}$, $V_{13}$, ...; $V_{21}$, $V_{22}$, $V_{23}$, ... and each of the molten resin temperature values $T_1$, $T_2$, $T_3$, ... obtained in the first and second phases are substituted in the equation (7), the constants "b" and "c" are fixed so that the PVT property relation formula can be established.

If the molten resin specific volume value $V_o$ for the reference molten resin pressure value $P_o$ is obtained with the molten resin temperature value T varied, the molten resin temperature value T and the molten resin specific volume value V are approximated as expressed by the following linear equation:

$$V_o = \alpha \cdot T + \beta \tag{8}$$

$\alpha, \beta$: constants

Therefore, when the equation (8) is substituted in the equation (7), the following equation results:

$$V = (a \cdot T + \beta) \cdot \exp\{(b \cdot T + c) \cdot (\sqrt{P/P_o} - 1)\}$$

In the previous process, the constant "a" was approximated by a linear equation. When the molten resin temperature value T changes, the constant "a" changes with the molten resin temperature value T as a variable. Therefore, the constant "a" can be modified to be adaptable to actual equipment by using the polynomial approximation of the molten state resin temperature value T as indicated by the following equation:

$$a(T) = b' \cdot T^m + b'' \cdot T^{m-1} + \ldots + b^{m'} \cdot T + c'$$

$b', b'' \ldots b^{m'}, c'$: constants

Similarly, with a constant molten resin pressure value P, when the molten resin temperature value T changes, the molten resin specific volume value $V_o$ changes with the molten resin temperature value T as a variable. Therefore, it is preferable to employ the following polynomial approximation of the molten resin temperature value T:

$$V_o = \alpha' \cdot T^n + \alpha'' \cdot T^{n-1} + \ldots + \alpha^{n'} \cdot T + \beta'$$

$\alpha', \alpha'', \ldots \alpha^{n'}, \beta'$: constants

EXAMPLE 2

Example 2 on a resin property detection method according to the present invention is described hereinafter. Only the processes different from those in the Example 1 are described in the Example 2, with the description of the similar processes omitted.

The PVT property relation formula is established by repeating the following three processes for each of the molten resin temperature values $T_1, T_2, T_3, \ldots$ 1) First Process Similar to the first process of the first phase of the Example 1, the screw 19 is rotated with the block valve 33 closed, and stopped when it has been retreated to a preliminarily set initial position. Then, pushing force values $p_{so}, p_{s1}, p_{s2}, \ldots, p_{sn}$ are applied sequentially to the screw 19 to compress the molten resin. Under each of these pushing force values $p_{so}, p_{s1}, p_{s2}, \ldots p_{sn}$, the screw 19 makes a balancing movement and stops at a first stop position indicated by the positional value $S_{so}, S_{s1}, S_{s2}, \ldots$ or $S_{sn}$, which is detected by the screw position detector 28 and sent to the PVT arithmetic unit 29. Other operations are the same as those in the first process of the first phase in the Example 1.

2) Second Process

A pushing force value p, which is applied immediately before injection in the ordinary production process, is applied to the screw 19 and the block valve 33 is opened, so that the molten resin of the weight for one batch is injected into the cavity 18 of the mold 10 to form an actual product. Next, a pushing force value p, which is applied during the dwelling following the injection in the ordinary production process, is applied to the screw 19 and the block valve 33 is closed. The weight value G of the injected molten resin is measured by an external measuring instrument and input through the external input unit 32 to the PVT arithmetic unit 29.

3) Third Process

Similar to the first process, pushing force values $p_{so}, p_{s1}, p_{s2}, p_{sn}$, are applied sequentially to the screw 19. Under each of these pushing force values $p_{so}, p_{s1}, p_{s2}, \ldots, p_{sn}$, the screw 19 makes a balancing movement and stops at a second stop position indicated by the positional value $S_{Fo}, S_{F1}, S_{F2}$ or $S_{Fn}$, which is detected by the screw position detector 28 and sent to the PVT arithmetic unit 29.

In a series of above-mentioned processes, the molten resin of the weight value G is injected "n" times. Accordingly, for a constant molten resin temperature value T, the following equation holds:

$$\frac{G}{A} = \frac{(S_o + S_{So})}{V(P_{So}, T)} - \frac{S_o + S_{Fo}}{V(P_{So}, T)} \qquad (9)$$

$$= \frac{S_o + S_{S1}}{V(P_{S1}, T)} - \frac{S_o + S_{F1}}{V(P_{S1}, T)}$$

$$= \ldots$$

$$= \frac{S_o + S_{Sn}}{V(P_{Sn}, T)} - \frac{S_o + S_{Fn}}{V(P_{Sn}, T)}$$

$$\frac{G}{A} = \frac{S_{Sn} - S_{Fn}}{V(P_{Sn}, T) = \frac{\Delta S_n}{V(P_{Sn}, T)}}$$

wherein

A : projected sectional area of the screw 19

So : travel distance of the screw 19 converted from the remaining molten resin volume value The following equation is obtained by substituting the equation (4) in the equation (5):

$$\frac{V(P_{Sn}, T)}{V(P_{So}, T)} = \exp\{a \cdot (\sqrt{P_{Sn}/P_{So}} - 1)\} \qquad (10)$$

$$= \frac{\Delta S_n}{\Delta S_o} \left( = \frac{S_{Sn} - S_{Fn}}{S_{So} - S_{Fo}} \right)$$

By operating the above equation (10), the formula for such relation between the molten resin pressure (P) and the weight value G of the molten resin injected by one injecting operation that will not give an adverse affect on an actual molded product can is obtained.

By substituting the equation (10) in the equation (9), the following equation holds:

$$\frac{G}{A} = \left[\frac{1}{\Delta S_o}\right] \cdot \frac{V(P_n, T)}{\exp\{a \cdot (\sqrt{P_{Sn}/P_{So}} - 1)\}} \qquad (11)$$

The equation (11) is the PV property relation formula for a constant molten resin temperature value T. The PVT arithmetic unit 29 operates this equation (11) to establish the PV property relation formula for a constant molten resin temperature values T. The similar process is repeated for each of the molten resin temperature values $T_1, T_2, T_3, \ldots$ to establish the PVT property relation formula for each molten state value.

In the Example 1 and the Example 2, the following equation is used to establish the PVT property relation formula:

$$V = V_o \exp\{a(T) \cdot \sqrt{P/P_o} - 1\}$$

Alternatively, the Spencer and Gilmore's equation as shown below may be used:

$$V = \frac{R' \cdot T}{P + \pi_1} + \omega \tag{12}$$

wherein
T : molten resin temperature value.
$\pi_1$, $\omega$, R':constants determined by the type of plasticized synthetic resin The values for the constants $\pi_1$, $\omega$ and R' may be obtained in the following procedure:

Firstly, the molten resin specific volume value $V_0$ under a constant molten resin pressure value $P_0$ and at a constant molten resin temperature value $T_0$ is obtained in the same method as in the first phase of the Example 1. Secondly, under the same molten resin pressure value $P_0$, the value for the constant $\omega$ is obtained with the molten resin temperature value T varied. Then, at the constant molten resin temperature value $T_0$, the molten resin volume is obtained with the molten resin pressure value P set at $P_1$, in the same method as in the second phase of the Example 1, and the molten resin specific volume value $V_1$ under the molten resin pressure value $P_1$ is calculated from the above-mentioned molten resin specific volume value $V_0$ by the proportional calculation. On the basis of the molten resin pressure values $P_0$ and $P_1$, the molten resin specific volume value $V_0$ and $V_1$ and the constant $\omega$, the value for the constant $\pi_1$ can be calculated by the following equation:

$$\frac{V_o - \omega}{V_1 - \omega} = \frac{\frac{R'T_o}{P_o + \pi_1}}{\frac{R'T_o}{P_1 + \pi_1}}$$

$$= \frac{P_1 + \pi_1}{P_o + \pi_1}$$

$$= \frac{P_o + \pi_1 + \Delta P}{P_o + \pi_1} \quad (\because \Delta P = P_1 - P_o)$$

$$= 1 + \frac{\Delta P}{P_o + \pi_1}$$

When the values for the constans $\omega$ and $\pi_1$ have been obtained, it is possible to calculate the value for the constant R' by the equation (12). For other types of plasticized synthetic resin, the values for the constants $\omega$, $\pi_1$, and R' may be obtained from the above procedures, if necessary.

In the above, the method of establishing the PVT property relation formula by using the. Spencer and Gilmore's equation has been described. Alternatively, the PVT property relation formula may be established by using the experimental analysis method according to the design of experiment (multivariable sequential approximation).

Figure 5:
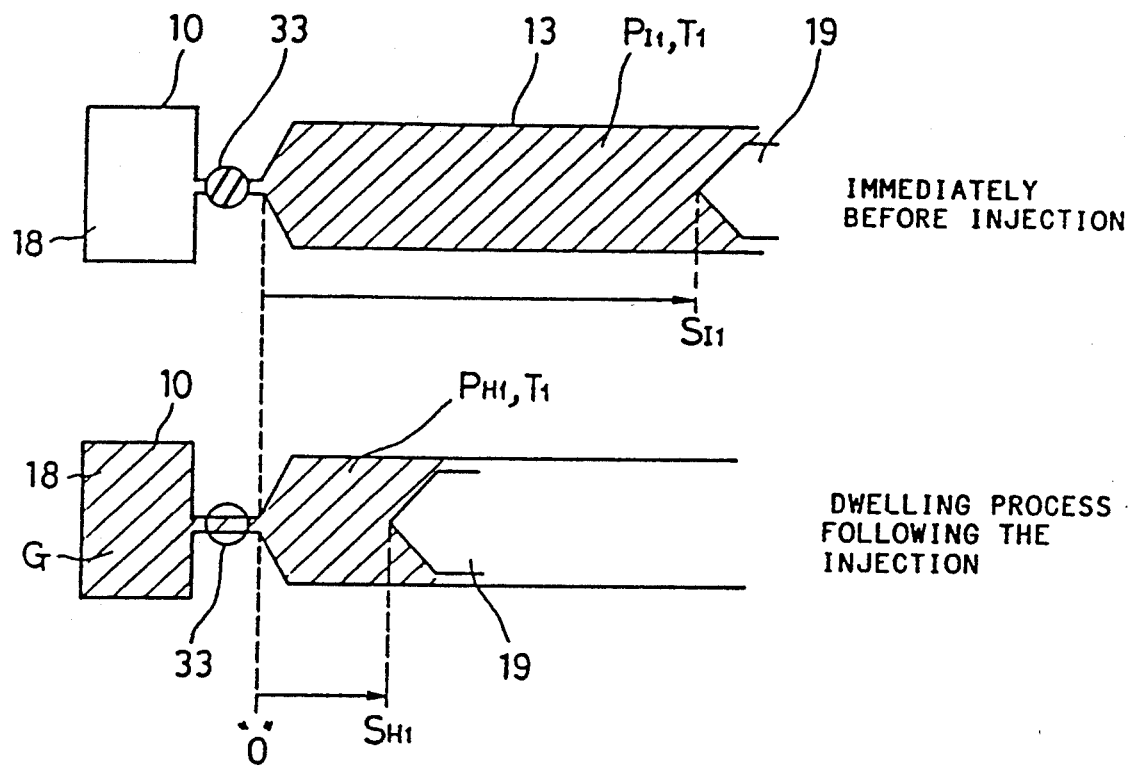

The embodiments of an injection control method according to the present Invention are based on the PVT property relation formula thus established in the above procedure. Prior to explaining each embodiment of the injection control method, the calculation formula used to obtain the travel distance of the screw 19 for injecting a constant weight value of molten resin is explained with reference to FIG. 5.

First, for plasticized synthetic resin of a constant molten resin temperature value $T_1$, the molten resin pressure value P, the positional value S of the screw 19 and the molten resin specific volume value V immediately before injection and those during the dwelling after the injection are set as follows:

The values immediately before injection:
Molten resin pressure value : $P_{J1}$
Positional value of the screw 19 : $S_{J1}$
Molten resin specific volume value : $V(P_{J1}, T_1)$
The values during the dwelling after the injection:
Molten resin pressure value : $P_{H1}$
Positional value of the screw 19 : $S_{H1}$
Molten resin specific volume value : $V(P_{H1}, T_1)$ The positional values $S_{J1}$, and $S_{H1}$ of the screw 19 are based on the distance from the position of the screw 19 indicated by the positional value "0". These positional values $S_{J1}$ and $S_{H1}$ are corrected values based on the remaining moltern resin volume.

The weight value G of the molten resin injected by one injecting operation into the cavity 18 of the mold 19 can be expressed as follows:

$$G = A \left( \frac{S_{J1}}{V(P_{J1}, T_1)} - \frac{S_{H1}}{V(P_{H1}, T_1)} \right) \tag{13}$$

in which
A : projected sectional area of the screw 19
This equation (13) can be rewritten as follows:

$$G = A \cdot S_{J1} \left[ \frac{1}{V(P_{J1}, T_1)} - \frac{1}{V(P_{H1}, T_1)} \right] + \tag{14}$$

$$A \cdot \frac{1}{V(P_{H1}, T_1)} \cdot (S_{J1} - S_{H1})$$

The travel distance $S_D$ of the screw 19 to the position for injection is expressed as follows:

$$S_D = S_{J1} - S_{H1} \quad \ldots (15)$$

When the equation (15) is substituted in the equation (14) and rearranged, the following equation is obtained:

$$S_D = S_{J1} - S_{H1} = \tag{16}$$

$$V(P_{H1}, T_1) \cdot \left\{ \frac{G}{A} - S_{J1} \cdot \left[ \frac{1}{V(P_{J1}, T_1)} - \frac{1}{V(P_{H1}, T_1)} \right] \right\}$$

In the equation (16), the projected sectional area A of the screw 19 is known. The positional value $S_{J1}$ of the screw 19 immediately before injection is detected by the screw position detector 28. The molten resin specific volume values $V(P_{J1},T_1)$ and $V(P_{H1},T_1)$ are obtained from the PVT property relation formula that has been established in the aforementioned procedure on the basis of the molten resin temperature value $T_1$ and molten resin pressure values $P_{J1}$ and $P_{H1}$ detected by the resin temperature detector 30 and by the oil pressure detector 31, respectively, or on the basis of the molten resin temperature value $T_1$ and molten resin pressure values $P_{J1}$ and $P_{H1}$ to be set.

Therefore, by using the equation (16), it is possible to obtain the travel distance $S_D$ of the screw 19 which keeps the injected resin weight value G constant.

FIRST EMBODIMENT

Figure 6:
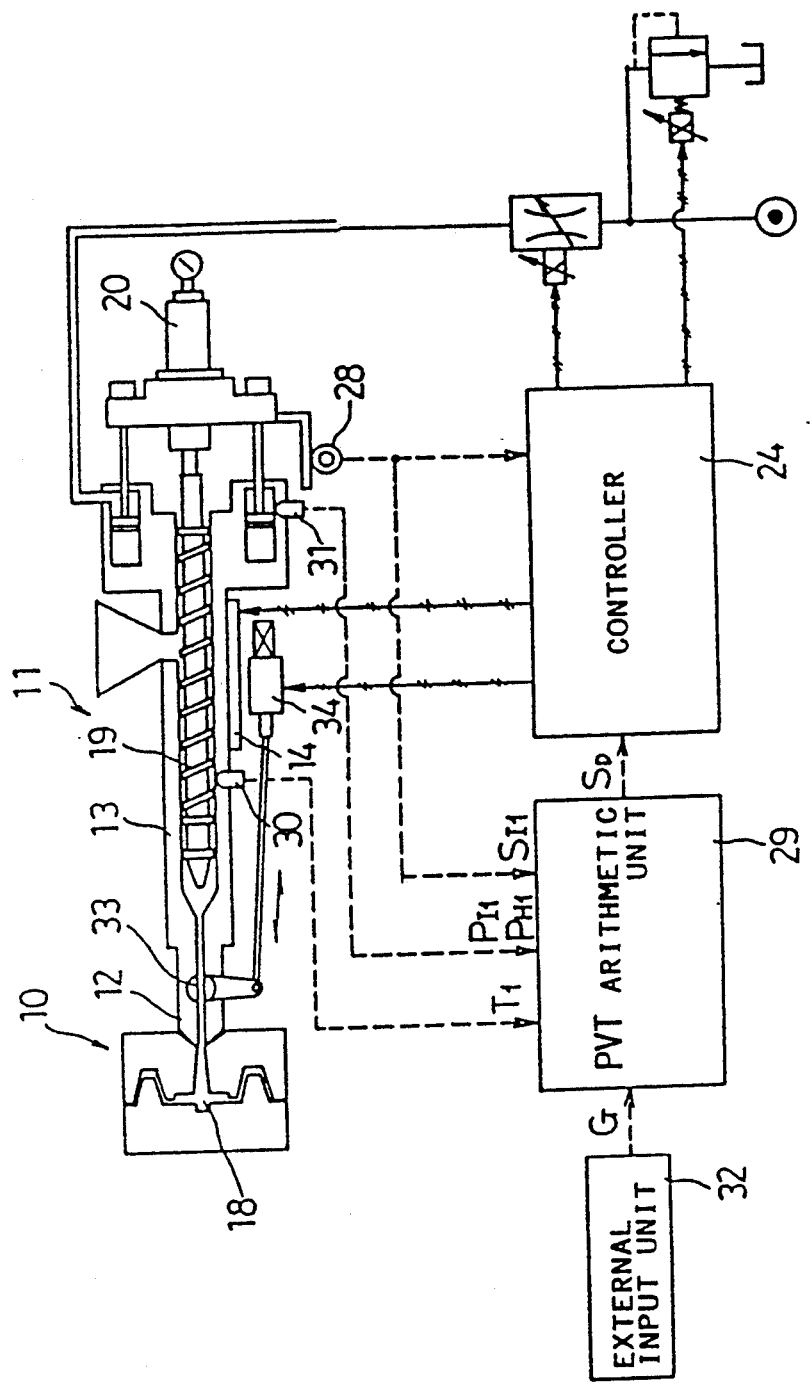

An embodiment of the injection control method according to the present invention is described on the assumption that the screw position detector 28 detects the positional value $S_{I1}$ of the screw 19 immediately before injection, the resin temperature detector 30 detects the molten resin temperature value $T_1$, and the oil pressure detector 31 detects the molten resin pressures values $P_{I1}$ and $P_{H1}$ immediately before injection and during the dwelling after the injection, and that each of these detectors outputs the detected value to the PVT arithmetic unit 29, as shown in FIG. 6.

First, the injection weight value G, as the target weight value of a product, is input through the external Input unit 32 to the PVT arithmetic unit 29. The screw 19 is rotated and retreated while the amount of molten resin to be injected is measured. After the rotation of the screw 19 is stopped, a pushing force is applied to the screw 19. Then, the screw position detector 28 detects the positional value $S_{I1}$ of the screw 19 immediately before injection, with the block valve 33 closed. At the same time, the oil pressure detector 31 detects the molten resin pressure values $P_{I1}$ (or pushing force value $p_{I1}$), and the resin temperature detector 30 detects the molten resin temperature value $T_1$. These values are input to the PVT arithmetic unit 29.

The block valve 33 is then opened so that injection is started. As the screw 19 Is moved forward, the cavity 18 of the mold 10 is filled with the injected molten resin. When the cavity 18 has been almost completely filled up, the dwelling process starts. The molten resin pressure value $P_{H1}$ (pushing force value $p_{H1}$) during the dwelling process following the injection is also detected by the oil pressure detector 31 and input to the PVT arithmetic unit 29. The PVT arithmetic unit 29 then calculates the travel distance $S_D$ of the screw 19 by the equation (16), from the input positional value $S_{I1}$, molten resin pressure values $P_{I1}$ and $P_{H1}$ and molten resin temperature value $T_1$, on the basis of the PVT property relation formula. The calculated travel distance $S_D$ is sent to the controller 24 where it is compared with the positional value provided by the screw position detector 28. When the travel distance $S_D$ is equal to the positional value, the controller 24 closes the block valve 33, thus terminating the injection of the molten resin into the cavity 18 of the mold 10.

Thus, according to this embodiment, the travel distance $S_D$ for injection of the resin of a constant weight value G can be obtained even if the molten resin pressure values $P_{I1}$ and $P_{H1}$ and the molten resin temperature value $T_1$ vary.

SECOND EMBODIMENT

Figure 7:
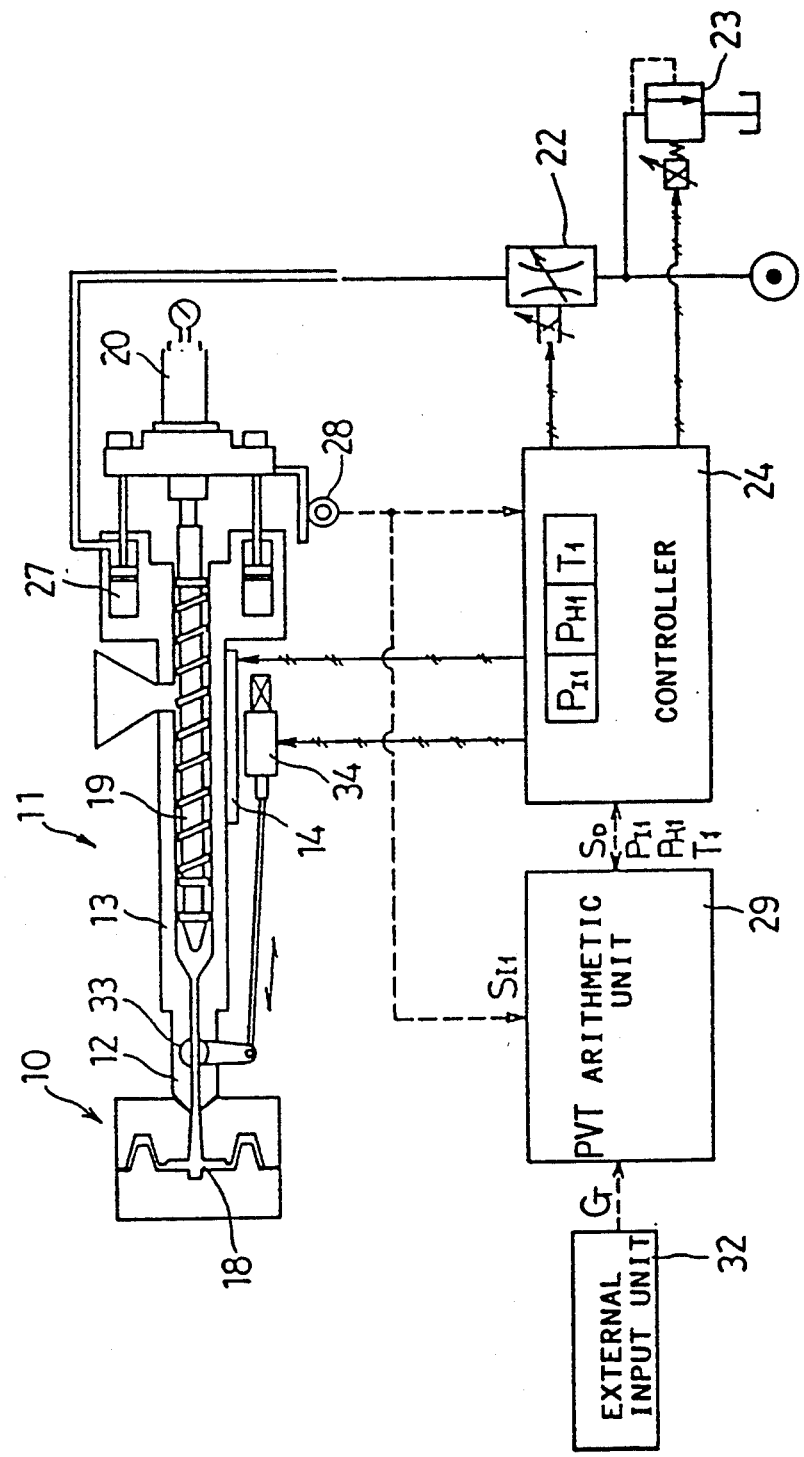

Another embodiment of the injection control method is described on the assumption that the positional value $S_{I1}$ of the screw 19 immediately before injection is detected and transmitted to the PVT arithmetic unit 29, and that the molten resin pressure values $P_{I1}$ and $P_{H1}$ and molten resin temperature value $T_1$ preliminarily set in the controller 24 are also transmitted to the PVT arithmetic unit 29, as shown in FIG. 7. For this embodiment, only the operations different from those in the first embodiment is described, with the description of same operations omitted.

The controller 24 controls the electromagnetic flow valve 22 and electromagnetic pressure valve 23 so that set molten resin pressure values $P_{I1}$ and $P_{H1}$ are obtained. The controller 24 also controls the heater 14 so that set molten resin temperature value $T_1$ is obtained. The PVT arithmetic unit 29 calculates the travel distance $S_D$ from the positional value $S_{I1}$ of the screw 19 immediately before injection input from the screw position detector 28 and the molten resin pressure values $P_{I1}$ and $P_{H1}$ and molten resin temperature value $T_1$ set in the controller 24, on the basis of the PVT property relation formula. The calculated travel distance $S_D$ is sent to the controller 24. Other operations are the same as those in the first embodiment.

In the first embodiment, the travel distance $S_D$ of the screw 19 is calculated based on the molten resin pressure value $P_{I1}$, $P_{H1}$ and the molten resin temperature value $T_1$ to be detected this time, the fluctuation range of each value $P_{I1}$, $P_{H1}$, $T_1$ at every injection filling during the continual formation process In a short period is extremely small. In other words, even if each value $P_{I1}$, $P_{H1}$, $T_1$ are detected at every injection filling, it is often the case that these value $P_{I1}$, $P_{H1}$, $T_1$ are within the detection error and even the calculation is done based on the each value having the error, the actual formation of the molds varies. Furthermore, the changes in the molten resin pressure and molten resin temperature occur gradually and caused by the change of the outside temperature and water temperature during the continual formation for a long period of time. Thus, the changed amount is caused not by injection filling of five or ten times but by the injection filling of hundred times or thousand times. Accordingly, in order to improve the detecting accuracy on the assumption of the detecting error of the molten resin pressure and the molten resin temperature, the mean value of the detected value $P_{I1}$, $P_{H1}$, $T_1$ in a short period of two to ten times can be employed. Also, instead of the $P_{I1}$, $P_{H1}$, $T_1$ to be detected this time, the detected value of the previous time $P_{I1}$, $P_{H1}$, $T_1$ can be employed or the mean value of the $P_{I1}$, $P_{H1}$, $T_1$ from two to ten times up to the previous times can be employed.

Figure 8:
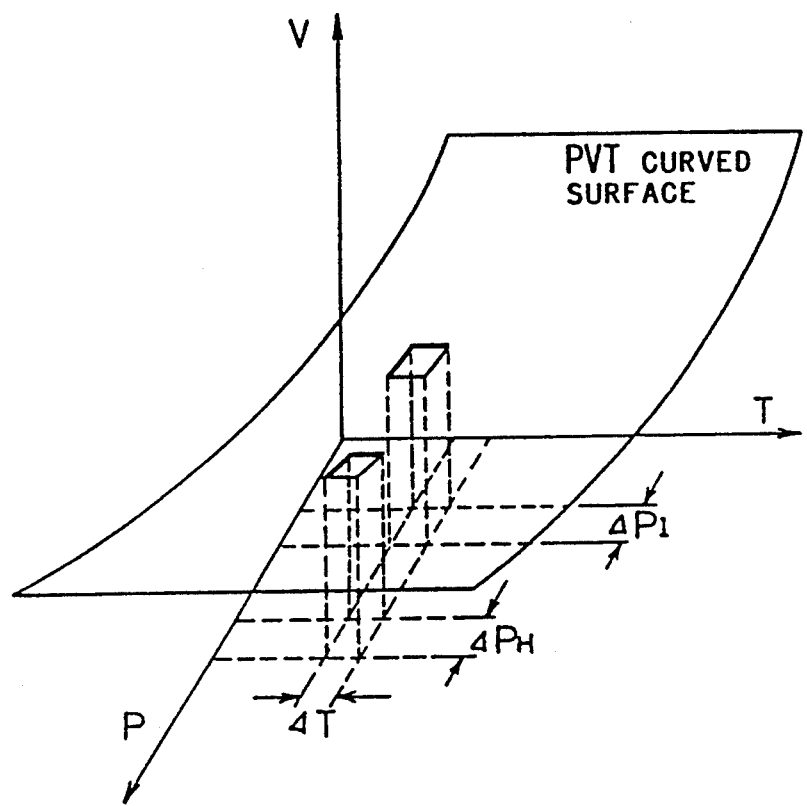

In the first and second embodiments, PVT property relation formula which is obtained from the Example 1 and Example 2, in other words, as shown in FIG. 8, PVT property formula forming the PVT curved surface in the three dimensional coordinates of the molten resin pressure axis P, molten resin specific volume axis V and the molten resin temperature axis T is directly employed in order to calculate the travel distance $S_D$ of the screw 19. However, in the actual continual injection formation, the range of change of the molten resin pressure value P and molten resin temperature value T is quite little, so that the fluctuation range of the molten resin pressure value P and molten resin temperature value T can be dealt with a range of a value which is capable for plain approximation. Accordingly, instead of directly using the PVT property relation formula obtained in the above-mentioned method, calculation can be done based on the formula of plain approximation by setting the molten resin specific volume value V (P,T) as molten resin specific volume value V (P$\pm\Delta$P, T$\pm\Delta$T). $\Delta$P and $\Delta$T are the expected range of fluctuation within the allowed range. As to the method of obtaining the molten resin specific volume value V ($P_I$, T) and molten resin specific volume value V ($P_H$, T), the method of substituting the value given by changing the formula $P_I \rightarrow P_I \pm \Delta P_I$, $P_H \rightarrow P_H \pm \Delta P_H$, $T \rightarrow T \pm \Delta T$, forcedly, and the weight value of the formation obtained as a result of changing the formula, directly into the plain approximation formula can be employed.

In the first and the second embodiment, though the travel distance $S_D$ of the screw 19 is calculated using the PVT property relation formula, it can be calculated on the basis of the formula (5) and (11), using the PVT property relation formula, under the assumption that the fluctuation range of the molten resin temperature value T is small and constant. In using the PV property relation formula, if the positional value $S_{I0}$, $S_{H0}$ of the screw 19 imidiately before the injection and during the dwelling process following the injection for keeping the injection weight value G constant in a stable formation, respectively, is known at immediately before the injection for keeping the injection weight value G constant in a stable formation and at the dwelling process following the injection, respectively, of the molten resin pressure values $P_{I0}$, $P_{H0}$, as a reference, the travel distance of the screw 19 can be obtained by the following formula:

$$S_D \left[ = V(P_{H1}) \cdot \left( \frac{G}{A} - S_{I1} \cdot \left[ \frac{1}{V(P_{I1})} - \frac{1}{V(P_{H1})} \right] \right) \right] =$$

$$S_{Io} \cdot \left[ \frac{V(P_{I1})}{V(P_{Io})} - \frac{V(P_{H1})}{V(P_{Ho})} \right] + (S_{Io} - S_{Ho}) \frac{V(P_{H1})}{V(P_{Ho})} -$$

$$S_{Io} \cdot \left[ \frac{V(P_{I1})}{V(P_{Io})} - 1 \right]$$

$$\begin{bmatrix} \because (14) \text{ formula} \rightarrow \\ G = A \cdot S_{Io} \cdot \left[ \frac{V(P_{I1})}{V(P_{Io})} - \frac{V(P_{H1})}{V(P_{Ho})} \right] + A \cdot \frac{S_{Io} - S_{Ho}}{V(P_{Ho})} \end{bmatrix}$$

In other words, the values other than positional value $S_{I0}$, $S_{H0}$, $S_{I1}$ the screw 19 are indicated as a ratio for the molten resin specific volume value V. The ratio of the molten resin specific volume value V is obtained as a ratio of the molten resin specific volume value In the constant molten resin temperature value T. Thus, when the fluctuation range of the molten resin temperature value T is small enough to be ignored, and only the molten resin pressure value $P_I$, and $P_H$ fluctuate, the weight value G of a product can be kept constant only by obtaining the compression property of the molten resin to be injected, which is measured by the screw 19 in a closed state of the blocked valve 33.

In another embodiment, in case that the blocked valve 33 is not installed in the flow passage 16 of the nozzle 12, a shut-off valve installed in the gate 17 of the mold 10 can be used as a blocked valve 33.

POTENTIAL INDUSTRIAL APPLICATION

According to the present invention, appropriate travel distance of the screw can be calculated on the basis of the resin property and the formula. Therefore, the injection control method of an injection molder of the present invention is especially suitable when the mold is changed.

What is claimed is:

1. An injection control method for an injection molder comprising a cylinder having a screw therein for the injection of resin from the cylinder, for controlling the weight of the plasticized synthetic resin injected from the cylinder of the injection molder to fill the cavity of a mold and form a product of weight value G, the method comprising the steps of:

calculating the travel distance $S_D$ of the screw from an initial stop position to inject an amount of plasticized synthetic corresponding to the weight value G of the product, at a constant molten resin temperature value T, on the basis of the detected or set molten resin pressure value $P_I$ of plasticized synthetic resin immediately before injection, the detected or set molten resin pressure value $P_H$ of plasticized synthetic resin during the dwelling process following the injection, the detected positional value $S_I$ of the screw immediately before injection, and the PV property relation formula of plasticized synthetic resin, as follows:

$$S_D = S_I - S_H = V(P_H) \cdot \left( \frac{G}{A} - S_I \cdot \left[ \frac{1}{V(P_I)} - \frac{1}{V(P_H)} \right] \right)$$

wherein
$S_H$: the positional value of the screw during the dwelling process following the injection,
A: the projected sectional area of the screw,
$V(P_H)$: the molten resin specific volume value during the dwelling process following the injection, and
$V(P_I)$: the molten resin specific volume value immediately before injection;
presenting the thus-calculated travel distance $S_D$; and
terminating the injection of the plasticized synthetic resin into the mold cavity when the screw has moved the preset travel distance $S_D$ from its initial stop position immediately before injection.

2. The injection control method for an injection molder according to claim 1, wherein said molten resin pressure values $P_I$ of plasticized synthetic resin detected immediately before injection and $P_H$ of plasticized synthetic resin detected during the dwelling process following the injection, respectively, are mean values of each of the molten resin prssure values $P_I$ and $P_H$ detected in a plurality of continuous injection operations for a specified period of time.

3. The injection control method for an injection molder according to claim 2, wherein if the molten resin pressure value $P_I$ of plasticized synthetic resin immediately before injection is equal to the molten resin pressure value $P_H$ of plasticized synthetic resin during the dwelling process following the injection, calculation of said weight value G of a product is based on the difference $S_o$ as shown in the following equation:

$$G = \frac{A \cdot \Delta S_o}{V(P_I + P_H)}$$

wherein:
A: the projection sectional area of the screw, and
$\Delta S_o$: the difference between the positional value of the screw immediately before injection with the molten resin pressure value $P_I$ and the positional value of the screw during the dwelling process following the injection with the molten resin pressure value $P_H$ ($=P_I$).

4. The injection control method for an injection molder according to claim 1, wherein if the molten resin pressure value $P_I$ of plasticized synthetic resin immediately before injection is equal to the molten resin pressure value $P_H$ of plasticized synthetic resin during the dwelling process following the injection, calculation of said weight value G of a product is based on the difference $S_o$ as shown in the following equation:

$$G = \frac{A \cdot \Delta S_o}{V(P_I + P_H)}$$

wherein

A: the projected sectional area of the screw, and $\Delta S_o$: the difference between the positional value of the screw immediately before injection with the molten pressure value $P_I$ and the positional value of the screw during the dwelling process following the injection with the molten resin pressure value $P_H (= P_I)$.

5. An injection control method for an injection molder comprising a cylinder having a screw therein for the injection of resin from the cylinder, for controlling the weight of the plasticized synthetic resin injected from the cylinder of the injection molder to fill the cavity of a mold and form a product of weight value G, the method comprising the steps of:

calculating the travel distance $S_D$ of the screw from an initial stop position to inject an amount of plasticized synthetic corresponding to the weight value G of the product, on the basis of the detected or set molten resin temperature value T of injected plasticized synthetic resin, the detected or set molten resin pressure value $P_I$ of plasticized synthetic resin immediately before injection, the detected or set molten resin pressure value $P_H$ of plasticized synthetic resin during the dwelling process following the injection, the detected positional value $S_I$ of the screw immediately before injection, and the PVT property relation formula of plasticized synthetic resin, as follows:

$$S_D = S_I - S_H = V(P_H, T) \cdot \{G/A - S_I[1/V(P_I, T) - 1/V(P_H, T)]\}$$

wherein $S_H$: the positional value of the screw during the dwelling process following the injection, A: the projected sectional area of the screw, $V(P_H, T)$: the molten resin specific volume value for the molten resin temperature value T and the molten resin pressure value $P_H$ during the dwelling process following the injection at the molten resin temperature value T, and $V(P_I, T)$: the molten resin specific volume value for the molten resin temperature value T and the molten resin pressure value $P_I$ immediately before the injection at the molten resin temperature value T;

presetting the thus-calculated travel distance $S_D$; and terminating the injection of the plasticized synthetic resin into the mold cavity when the screw has moved the preset travel distance $S_D$ from its initial stop position immediately before injection.

6. The injection control method for an injection molder according to claim 5, wherein said detected molten resin temperature value T of the injected plasticized synthetic resin and said detected molten resin pressure values $P_I$ of plasticized synthetic resin immediately before injection and $P_H$ of plasticized synthetic resin during the dwelling process following the injection, respectively, are mean values of each of the molten temperature value T and molten resin pressures value $P_I$ and $P_H$ detected in a plurality of continuous injection operations for a specified period of time.

7. The injeciton control method for an injection molder according to claim 6, wherein said calculation of the molten resin specific volume V on the basis of the PVT property relation formula from the molten resin pressure value P and molten resin temperature value T uses the plane approximation, on the assumption that the fluctation of the molten resin pressure value P and of the molten resin temperature value T is within a specified range.

8. The injection control method for an injection molder according to claim 5, wherein said calculation of the molten resin specific volume V on the basis of the PVT property relation formula from the molten resin pressure value P and molten resin temperature value T uses the plane approximation, on the assumption that the fluctation of the molten resin pressure value P and of the molten resin temperature value T is within a specified range.

* * * * *